June 6, 1933.  D. C. PRINCE  1,913,211
DOUBLE SPEED ALTERNATING CURRENT MOTOR
Filed Nov. 12, 1932
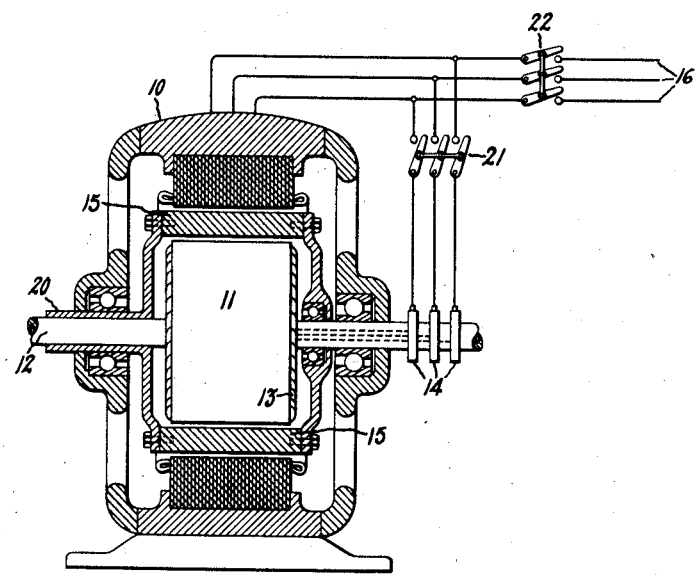
Inventor:
David C. Prince,
by Charles E. Tullar
His Attorney Patented June 6, 1933

1,913,211

UNITED STATES PATENT OFFICE

DAVID C. PRINCE, OF SWARTHMORE, PENNSYLVANIA, ASSIGNOR TO GENERAL ELECTRIC COMPANY, A CORPORATION OF NEW YORK

DOUBLE SPEED ALTERNATING CURRENT MOTOR

Application filed November 12, 1932. Serial No. 642,398.

My invention relates to synchronous alternating current motors of the type arranged to rotate at double the usual speed for a given pole number and excitation frequency.

In the type of motor in question, both the stator and rotor are provided with primary windings having reversed phase rotation, so that to establish synchronism between the two rotating magnetic fields the rotor must operate with respect to the stator at double the speed of either field. Such motors are desirable when a very high speed is required, but the main difficulty heretofore has been in providing a simple scheme for starting the motor and bringing it up to the synchronous speed. My invention relates to such a motor having simple starting facilities included in the motor.

According to my invention, I provide a freely rotatable magnetic member between the two primary elements of such a motor. This intermediate member has two functions, namely, to act as a secondary for both primary rotating magnetic fields during starting and accelerating and simply as a path for the flux between the two primary members when double synchronous speed is established.

The features of my invention which are believed to be novel and patentable will be pointed out in the claims appended hereto. For a better understanding of my invention, reference is made in the following description to the accompanying drawing, showing a sectional view parallel to the shaft of a motor built in accordance with my invention.

Referring to Fig. 1, 10 represents an ordinary three-phase distributed winding stator element, which for the purpose of description will be assumed to be wound for two poles. Concentrically mounted within the stator element 10 is a rotor 11 secured to shaft 12. This element has a two-pole three-phase distributed primary winding 13 connected to slip rings 14 through the shaft 12, which is made hollow for that purpose. Between the two polyphase elements 10 and 11 is mounted a cylindrical member 15 made of steel. Member 15 is rotatively mounted on shaft 12 by means of suitable bearings so that it is free to rotate with respect to either member 10 or 11. The member 15 acts as a secondary for both primary members 10 and 11 during the starting period of the motor and merely as a flux conveyer between parts 10 and 11 when synchronous speed is reached.

It will be evident that if both primary windings on 10 and 11 are energized from a source of polyphase supply 16 with opposite phase rotations, they will produce rotating magnetic fields in the element 15 which rotate in opposite directions. If the frequency be 60 cycles, these fields will rotate at 3600 R. P. M., assuming elements 11 and 15 are stationary. The fluxes, therefore, cut element 15 at high speed in opposite directions. Hysteresis and eddy current losses are produced in element 15, and, due to the high frequency of the fluxes, they do not penetrate deeply into the two cylindrical surfaces of 15. Consequently, at the instant of starting there is practically no interference between the two rotating magnetic fields, but each acts upon the adjacent surface portion of element 15 to produce motor action as in a normal hysteresis motor. One field tends to drive 15 in one direction, and the other field tends to drive 15 in the opposite direction. Since part 10 is stationary and parts 15 and 11 rotatable, the latter two will start to rotate in the same direction but at different speeds. If the motor action on opposite surfaces of 15 are equal, part 15 will accelerate at half the speed of part 11. As acceleration increases, the fluxes in part 15 become of lower frequency and penetrate deeper into the steel body. As synchronism is approached, the rotating magnetic fields from the two primary members approach the same speed in the same direction in member 15 and consequently pull the rotating elements into synchronism, the fluxes becoming one flux taking the same path radially through member 15. The flux no longer shifts in member 15, since it is now rotating in the same direction and at the same speed as both fields. The hysteresis and eddy current losses cease and part 15 merely acts as a conveyer of unidirectional flux between parts 10 and 11 operating synchronously at a relative speed of 7200 R. P. M.

A hollow shaft 20 may be brought out from the intermediate member 15, as shown, making two synchronous speeds available at the same time, one 3600 R. P. M., and the other 7200 R. P. M., in the example given.

If the member 15 be made of hard steel it will start and synchronize as a synchronous hysteresis motor at 3600 R. P. M., with only primary 10 energized. Consequently, if only the latter speed is desired for a portion of the time, the primary part 11 may be deenergized by opening the switch 21, leaving switch 22 closed. Part 11 may be allowed to rotate at the same speed with part 15 and we may short circuit the winding of 11 for this kind of operation.

It is seen that the motor device in question comprises two synchronous hysteresis motors, the hysteresis secondary 15 being common to both motors. However, with both primaries energized at synchronous speed, we have an additional kind of synchronous motor action that does not depend upon the hardness of the steel in member 15 for synchronism, but, rather, upon the synchronizing action of the revolving fields produced by the primary members 10 and 11 acting upon each other. The details of construction may be modified to suit requirements.

What I claim as new and desire to secure by Letters Patent of the United States is:

1. A synchronous motor comprising two primary members concentrically mounted and relatively rotatable, and having primary windings of the same pole number, a relatively rotatable cylindrical steel member constituting hysteresis motor secondaries for both primary members concentrically interposed between said primary members, and means for energizing said primary windings to produce oppositely rotating magnetic fields in said steel member.

2. A double speed synchronous motor comprising concentrically mounted stationary and rotary primary members having windings of the same pole number, a cylindrical steel member rotatable with respect to both primary members and concentrically interposed between them, said steel member constituting hysteresis secondaries for both primary members, and means for energizing said primaries to produce oppositely rotating magnetic fields in said steel member.

3. A double speed synchronous motor comprising a primary stator member and a rotary primary member, both having windings for the same number of poles and being concentrically arranged so as to produce oppositely rotating magnetic fields in the intervening space, and means for bringing said motor up to the double synchronous speed determined by the sum of the speeds of the two rotating magnetic fields, comprising a hard steel unlaminated cylinder concentrically and rotatively mounted between said primary members, the external portion of said cylinder and the stator member comprising a synchronous hysteresis motor, and the internal portion of said cylinder and the rotary primary member comprising another synchronous hysteresis motor, said cylindrical member also serving to provide a path for the fluxes between said stator members at the double synchronous speed.

In witness whereof I have hereunto set my hand.

DAVID C. PRINCE.